Patented July 31, 1951

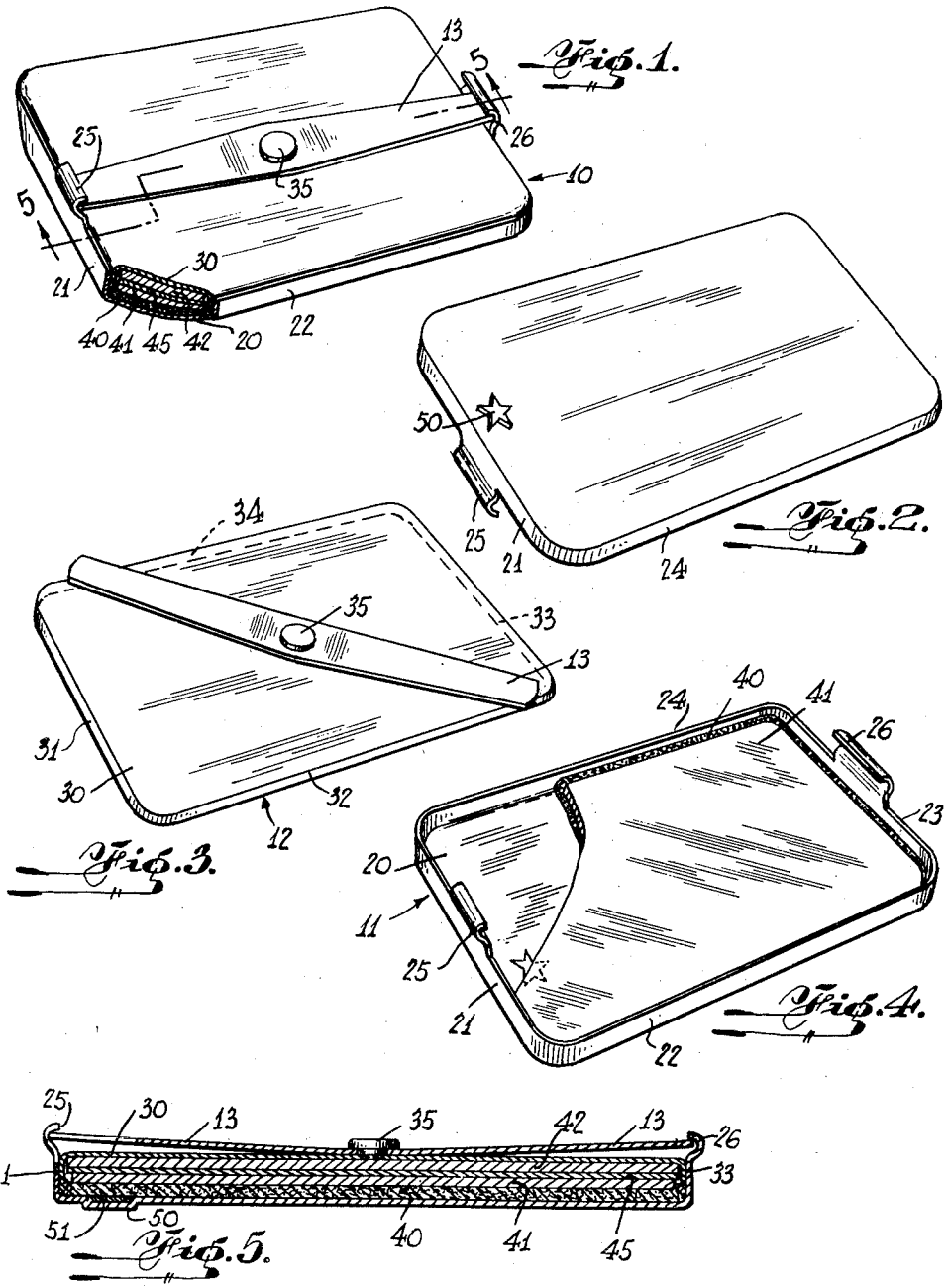
INVENTOR.
JULIUS BEN GOLDSMITH.
ATTORNEY.

2,562,453

UNITED STATES PATENT OFFICE 2,562,453

INTRAORAL CASSETTE

Julius Ben Goldsmith, Lawrence, N. Y.

Application September 19, 1949, Serial No. 116,590

5 Claims. (Cl. 250—69)

This invention relates to an improved intra-oral cassette.

The principal object of this invention is the provision of an improved intra-oral cassette which is perfectly lightproof in every respect, and especially along its respective edges, so that once it is closed there is no possibility whatsoever that light will penetrate to the film contained therein.

In conventional cassettes the cover comprises a substantially flat sheet of metal having a felt padding attached thereto on its inner or under side. The film is disposed between intensifying screens below the felt so that very frequently light rays can and do penetrate to the edges of the film, through and along the edges of the felt. It is a peculiarity of occlusal radiographs that they require virtually perfect edge views. Frequently what they show along their respective edges is by far more important than what they show in their more centrally located areas. It is, therefore, a vital requirement that the edges of the cassette be perfectly light-proof.

In the present invention, the cover is provided with downwardly-extending flanges along all of its side edges. The felt padding rests upon and lines the floor of the container proper. The film is disposed between the intensifying screens, one of which is cemented to the cover and the other of which is secured to the casing. When the cover is clamped down tightly upon the container proper, its respective flanges by-pass the film and intensifier and impinge upon the felt padding. In actual practice, the flanges bite into the felt padding and provide so tight a light-seal, that the cassette is perfectly light-proof for all practical purposes. The container proper is provided with upwardly turned flanges or walls which extend on the outside of the downwardly extending flanges of the cover. The flanges of the cover and the walls of the container proper are thereby through into close, parallel relationship with respect to each other and this feature too has the effect of excluding light from the inside of the container. It is the combination of the overlapping walls or flanges of the container and its cover, and the impingement of the flanges of the cover upon the felt padding on the floor of the container that makes for a perfectly light-tight casing.

Another principal object of this invention is the provision of an improved intra-oral cassette of the character described, wherein the downwardly extending flanges of the cover comprise guides for the proper location of the film within said cassette. The flanges of the cover abut the side edges of the film not only to properly position the film in the cassette in the first instance, but also to prevent accidental dislodgment or displacement of the film following its insertion into the cassette. These cover flanges or guides cannot be found in the cassettes known to the prior art.

What has above been said regarding the film is equally true of the intensifying screens. The cassette effectively prevents light from penetrating to the screens, and it also effectively and accurately positions the screens relative to the film and the film relative to the screen. Although the flanges of the cover impinge upon the felt, the felt is sufficiently yielding to enable the cover to press down tightly upon the screens and film contained in the cassette and to bring said screens and film into perfect and even apposition. The combination of perfect centering of the screens and film and the perfect apposition between them is productive of a picture of even density, sharpness of outline and detail on the entire surface of the film without any white or undeveloped borders which in many instances lessen the diagnostic value of said picture.

A preferred form of this invention is shown in the accompanying drawing, in which:

Fig. 1 is a perspective view of an intra-oral cassette made in accordance with the present invention, said cassette being shown in closed position, its casing being broken away in part to expose the inside thereof, including the film and the two intensifying screens and also the felt, said screens, film and felt being shown in section.

Fig. 2 is a perspective view of the casing of the cassette as viewed from the bottom.

Fig. 3 is a perspective view of the cover of said cassette, showing the clamping or locking means by which said cover may be clamped into tightly closed position relative to the casing.

Fig. 4 is a perspective view of the casing looking downwardly into it and showing the felt padding and one of the screens broken away to expose the floor of the casing.

Fig. 5 is a longitudinal section on the line 5—5 of Fig. 1, showing the casing, its cover and locking member, the pad, both screens and the film in vertical section.

As has above been indicated, the intra-oral cassette 10 which is herein claimed comprises a casing 11, a cover 12 for said casing and a locking member 13 whereby the cover may be locked to the casing. It will thus be seen in Figs. 4 and 5 that the casing has a floor or bottom wall 20 and four side walls 21, 22, 23 and 24, respectively. The corners of the casing are all rounded to render it easier to insert the cassette into the mouth and to remove it therefrom. It will be noted that walls 21 and 23 are provided with upwardly and inwardly turned lugs 25 and 26, respectively. These lugs function in the manner of keepers for locking member 13 of cover 12 as Fig. 1 clearly shows. See also Fig. 5.

The cover 12 has a top wall 30 and four downwardly extending side walls or flanges 31, 32, 33 and 34. Wall 34 is similar to wall 32 and it lies directly opposite said wall 32. The corners of the cover are also rounded off to correspond to the rounded corners of the casing. Locking member 13 comprises a spring bar whose ends are bent upwardly as Fig. 5 clearly shows, the center portion of said bar being pivotally fastened to the center of the cover by means of a rivet 35. The bar is free to swing a full 360° around said rivet. When it is desired to lock the cover to the casing, the locking bar is swung lengthwise of the cover and hence of the casing, and its two ends are depressed to enable them to fit under cam lugs 25 and 26. The ends of the spring bar are then released to enable them to engage said lugs. This has the effect of locking the cover in closed position relative to the casing and at the same time to press the cover tightly against the casing.

It will be seen in the drawing that the overall shape of the casing corresponds to the overall shape of the cover. Both are rectangular in shape and both have correspondingly rounded corners. The cover and the casing do, however, differ in size. The outer dimensions of the cover are but very slightly smaller than the inner dimensions of the casing so that the cover may fit into the casing. Considering the cover and the casing both to constitute a pair of casing members, it will be understood that they must be brought into telescopic engagement with each other in order to place them in closed position, one relative to the other. When, therefore, the cassette is closed, the side walls 21, 22, 23, and 24 of the casing overlap, enclose, and are parallel to walls 31, 32, 33, and 34, respectively, of the cover. Since the cover is only slight smaller than the casing, this arrangement affords very little opportunity to the light to enter the cassette once the cassette is closed.

It will be seen especially in Fig. 5 that a resilient pad or padding 40 is mounted on the floor of the casing. This padding extends across the entire floor from wall to wall. The pad 40 is permanently secured to the floor of the casing by means of an adhesive. When the cover is placed in closed position relative to the casing, the side walls or flanges of the cover press or bite into the padding to provide a light-tight seal, preventing the light from entering the inside of the cassette, and more particularly, the inside of the cover.

The cassette is provided with two intensifying screens 41 and 42 which are cemented respectively to padding 40 and to the top wall 30 of the cover. When secured in this manner to the cover and to the padding of the casing, the screens will be permanently fixed in proper position relative to each other and to the film itself. Since the lower screen 41 is somewhat smaller than the padding, it will not prevent or interfere with engagement of the cover flanges with the edges of the padding when the cover is brought into closed position relative to the casing. The upper screen 42 may, if desired, extend the full distance from wall to wall of the cover and indeed, this is the preferred practice.

Film 45 is placed upon the cover screen 42 when it is desired to load the cassette. The overall dimensions of the film should correspond to the inside dimensions of the cover so that said cover and more particularly its four side walls or flanges, will engage the edges of the film to properly position and accommodate it. The casing is then laid over the film, with its side walls enclosing the side walls of the cover which in turn embrace the casing screen 41. While held firmly closed with the fingers, the cassette is inverted and the spring-locking member 13 may be rotated so its ends engage the lugs 25—26, thus locking the parts together.

Fig. 5 clearly shows that when the cover is clamped to the casing, the walls of the cover bypass the film and bite into the padding 40. This renders it totally impossible for the light to enter the cassette and impinge on the film. Once the cassette is closed, it becomes light-tight and remains so until it is once again opened.

It may be found desirable to mark one end of the film with a suitable character, numeral or symbol to identify the film and to render it more convenient to read and interpret. This may be done by placing a suitable or appropriate number, character or symbol made of lead or other similar material opaque to X-rays on the casing to block the passage of the X-rays to the film in the outline of said number, character or symbol and thereby to reproduce said number, character or symbol upon the film following exposure and development thereof.

In the preferred form of this invention a recess 50 is formed in the floor of the casing and the lead number, character or symbol 51 is mounted therein. Other well-known means may be employed to effect the same result.

In the preferred form of this invention, the cassette may be made of aluminum and bronze, although Monel metal (stainless steel) may also be used to good advantage. The pad or padding may be made of felt or other suitable resilient and cushioning material. Rubber, for example, may be substituted for the felt.

It will be understood that the cassette shown and described herein is purely illustrative of the present invention, and it should not be construed as limiting the invention. The illustrated cassette may be modified in many ways within the broad scope and coverage of the invention.

Having thus described my invention, what I claim as new and desire to secure by Letters Patent, is:

1. An intra-oral cassette comprising a container which has a floor and upwardly extending walls on all sides of said floor, a cover for said container, said cover having downwardly extending side walls on all sides thereof, which are adapted to project into said container and on the inside of the walls of said container, and a pad mounted on the floor of said container and abutting all of the side walls of said container, said downwardly extending side walls of the cover being situated for impingement upon the pad, on all sides thereof, when the cover is placed in closed position relative to said container.

2. An intra-oral cassette comprising a pair of casing members which are adapted for telescopic engagement with each other to hold the film in place between them, the outer of said casing members having a pad mounted therein, the inner of said casing members having side walls which are situated for impingement upon said pad to make said casing light-tight, the outer of said casing members being provided with a recess, and an opaque marker disposed in said recess, whereby the film may receive an identifying symbol when an X-ray picture is made.

3. An intra-oral cassette of the character described, comprising a pair of casing members which are in telescopic engagement with each other, one of said casing members having a top wall and four side walls, the other casing member having a bottom wall and four side walls, the outer of said two telescopically-engaged casing members having a pad mounted therein which abuts all of its four side walls, the side walls of the inner of said telescopically-engaged casing members impinging upon said pad to prevent light from entering said cassette.

4. An intra-oral cassette of the character described, comprising a pair of casing members which are in telescopic engagement with each other, one of said casing members having a top wall and four side walls, the other casing member having a bottom wall and four side walls, the outer of said two telescopically-engaged casing members having a pad mounted therein which abuts all of its four side walls, the side walls of the inner of said telescopically-engaged casing members impinging upon said pad to prevent light from entering said cassette, an intensifying screen fixedly secured to said top wall within the four side walls of the one casing member and an intensifying screen fixedly secured to said bottom wall within the four side walls thereof of the other casing member, the edges of each intensifying screen being equally spaced from the respective side walls of the member in which it is secured, and a photographic film uniformly clamped by and between the intensifying screens.

5. An intra-oral cassette in accordance with claim 4, wherein the outer of said casing members is provided with a recess, and an opaque marker is disposed in said recess whereby the film may receive an identifying symbol when an X-ray picture is made.

JULIUS BEN GOLDSMITH.

REFERENCES CITED

The following references are of record in the file of this patent:

UNITED STATES PATENTS

| Number | Name | Date |
|---|---|---|
| 1,622,371 | Geise | Mar. 29, 1927 |
| 1,662,838 | Stanton | Mar. 20, 1928 |
| 1,897,621 | Reuter | Feb. 14, 1933 |
| 1,933,652 | Boldingh | Nov. 7, 1933 |